US011851793B2

(12) United States Patent
Kamihira et al.

(10) Patent No.: US 11,851,793 B2
(45) Date of Patent: Dec. 26, 2023

(54) NON-TRANSITORY COMPUTER-READABLE MEDIUM AND METHOD OF GENERATING EMBROIDERY DATA

(71) Applicant: BROTHER KOGYO KABUSHIKI KAISHA, Nagoya (JP)

(72) Inventors: Yuta Kamihira, Ama-gun (JP); Mayumi Nishizaki, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 651 days.

(21) Appl. No.: 17/013,040

(22) Filed: Sep. 4, 2020

(65) Prior Publication Data
US 2020/0399804 A1 Dec. 24, 2020

Related U.S. Application Data

(63) Continuation of application No. PCT/JP2019/008557, filed on Mar. 5, 2019.

(30) Foreign Application Priority Data

Mar. 8, 2018 (JP) ................................. 2018-042008

(51) Int. Cl.
*D05B 19/08* (2006.01)
*D05C 5/02* (2006.01)
(Continued)

(52) U.S. Cl.
CPC .............. *D05B 19/08* (2013.01); *D05C 5/02* (2013.01); *D05C 5/06* (2013.01); *G05B 19/4097* (2013.01); *G05B 2219/36206* (2013.01)

(58) Field of Classification Search
CPC . D05B 19/08; D05C 5/02; D05C 5/06; G05B 19/4097; G05B 2219/36206; G05B 19/40935; G05B 2219/45196
See application file for complete search history.

(56) References Cited

U.S. PATENT DOCUMENTS 9,043,009 B2* 5/2015 Kato ................... D05B 19/12
112/102.5
2002/0038162 A1 3/2002 Yamada
(Continued)

FOREIGN PATENT DOCUMENTS

JP 2001-259268 A 9/2001
JP 2003-154181 A 5/2003
(Continued)

OTHER PUBLICATIONS

Setiabudi, D., Isa, S. M., & Iswanto, B. H. (2016). Digital color classification for colorful cross stitch threads using RGB+ Euclidean distance and LAB+CIE94. 2016 International Conference on Information & Communication Technology and Systems (ICTS). https://doi.org/10.1109/icts.2016.7910290 (Year: 2016).*

(Continued)

*Primary Examiner* — Thomas C Lee
*Assistant Examiner* — Tyler Dean Hedrick
(74) *Attorney, Agent, or Firm* — Oliff PLC

(57) ABSTRACT

A non-transitory computer-readable medium stores computer-readable instructions, when executed by a computer, causing the computer to execute a process. The process includes: obtaining image data; obtaining thread colors as available colors for sewing an embroidery pattern; setting a first color representing a target area; in a case where at least one color is assigned from the available colors as a color representing the target area, selecting a color close to the first color when combined with the at least one color assigned, from the available colors, as a candidate; determining whether a difference between color information representing the at least one color assigned and color information representing the candidate is smaller than a threshold value; in a case where the difference is smaller than the threshold value, adding the candidate to the at least one color assigned; and (Continued)

generating embroidery data associating thread color data with position data.

14 Claims, 6 Drawing Sheets

(51) Int. Cl.
*D05C 5/06* (2006.01)
*G05B 19/4097* (2006.01)

(56) References Cited

U.S. PATENT DOCUMENTS

2010/0305744 A1 12/2010 Yamada
2015/0144043 A1 5/2015 Maki

FOREIGN PATENT DOCUMENTS

JP 2010-273859 A 12/2010
JP 2015-100556 A 6/2015

OTHER PUBLICATIONS

Jun. 4, 2019 International Search Report issued in International Patent Application No. PCT/JP2019/008557.

* cited by examiner

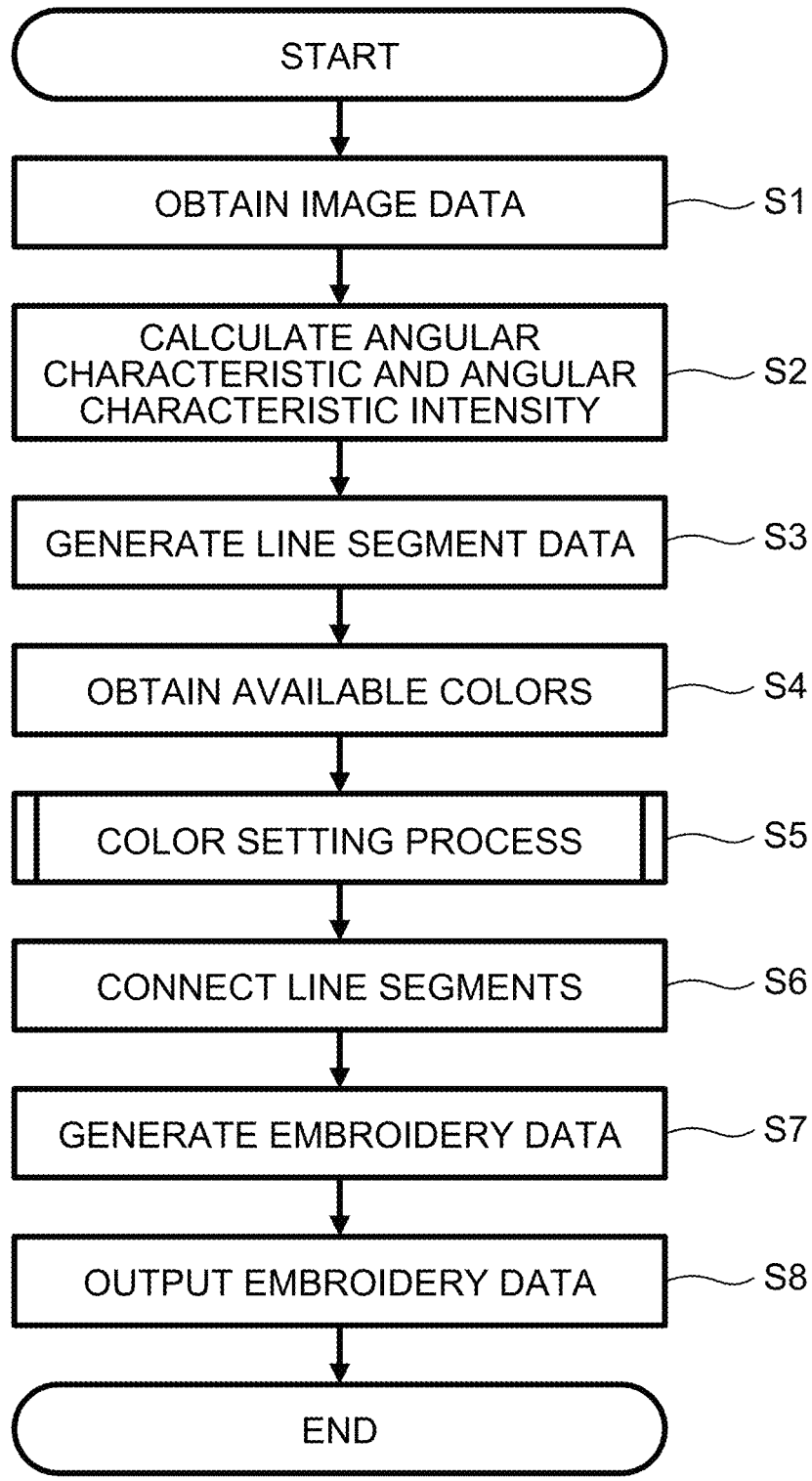

NON-TRANSITORY COMPUTER-READABLE MEDIUM AND METHOD OF GENERATING EMBROIDERY DATA

CROSS-REFERENCE TO RELATED APPLICATION

This is a continuation application of International Application No. PCT/JP2019/008557 filed on Mar. 5, 2019 which claims priority from Japanese Patent Application No. 2018-042008 filed on Mar. 8, 2018. The entire contents of the earlier applications are incorporated herein by reference.

TECHNICAL FIELD

Aspects of the disclosure relate to a non-transitory computer-readable medium and a method of generating embroidery data.

BACKGROUND

A known embroidery data generation apparatus generates embroidery data for design patterns to be sewn on sewing machines, based on image data of photographs and other materials. The known embroidery data generation apparatus generates embroidery data as follows. Line segments are positioned based on image data. The line segments are assigned thread colors, and line segments assigned the same thread color are connected. Line segment data are converted into stitch data, thereby generating embroidery data. A thread color associated with a line segment is selected from n colors previously set as thread colors to be used for actual sewing of an embroidery pattern.

SUMMARY

In a case where an image such as a photograph is represented by an embroidery pattern, the number (n) of thread colors for use in actual sewing is typically about ten. The known embroidery data generation apparatus reduces colors used in a source image to m colors, and then selects n colors, each close or analogous to one of the m colors after color reduction, as available thread colors that can be prepared by a user. The n colors are mixedly used in the embroidery pattern to represent the source image having a greater number of colors. Colors mathematically represented by mixing colors may be optically unnatural when represented on the embroidery pattern with stitches. Such unnaturalness may be easy to see on the embroidery pattern when disparate thread colors, for example, green and peach, are mixedly used to represent the skin tone of face in the source image.

Aspects of the disclosure provide a non-transitory computer-readable medium and a method of generating embroidery data by selecting thread colors suitable to represent an image.

According to one or more aspects of the disclosure, a non-transitory computer-readable medium stores computer-readable instructions. The computer-readable instructions, when executed by a computer, causes the computer to execute a process. The process includes: obtaining image data representing an image; obtaining a plurality of thread colors as available colors to be used for sewing an embroidery pattern; setting a first color representing a target area in the image; in a case where at least one color is assigned from the available colors as a color representing the target area, selecting a color close to the first color when combined with the at least one color assigned, from the available colors as a candidate; determining whether a difference between color information representing the at least one color assigned and color information representing the candidate is smaller than a threshold value; in a case where the determining determines that the difference is smaller than the threshold value, adding the candidate to the at least one color assigned; and generating embroidery data associating thread color data with position data, the thread color data representing a color selected from the at least one color assigned, the position data specifying a position to sew with a thread having the color represented by the thread color.

According to one or more aspects of the disclosure, a method of generating embroidery data includes: obtaining image data representing an image; obtaining a plurality of thread colors as available colors to be used for sewing an embroidery pattern; setting a first color representing a target area in the image; in a case where at least one color is assigned from the available colors as a color representing the target area, selecting a color close to the first color when combined with the at least one color assigned, from the available colors, as a candidate; determining whether a difference between color information representing the at least one color assigned and color information representing the candidate is smaller than a threshold value; in a case where the determining determines that the difference is smaller than the threshold value, adding the candidate to the at least one color assigned; and generating the embroidery data associating thread color data with position data, the thread color data representing a color selected from the at least one color assigned, the position data specifying a position to sew with a thread having the color represented by the thread color.

BRIEF DESCRIPTION OF THE DRAWINGS

FIG. 2 is a flowchart of a main process to be executed in the sewing data generation apparatus.

DETAILED DESCRIPTION

Figure 1:
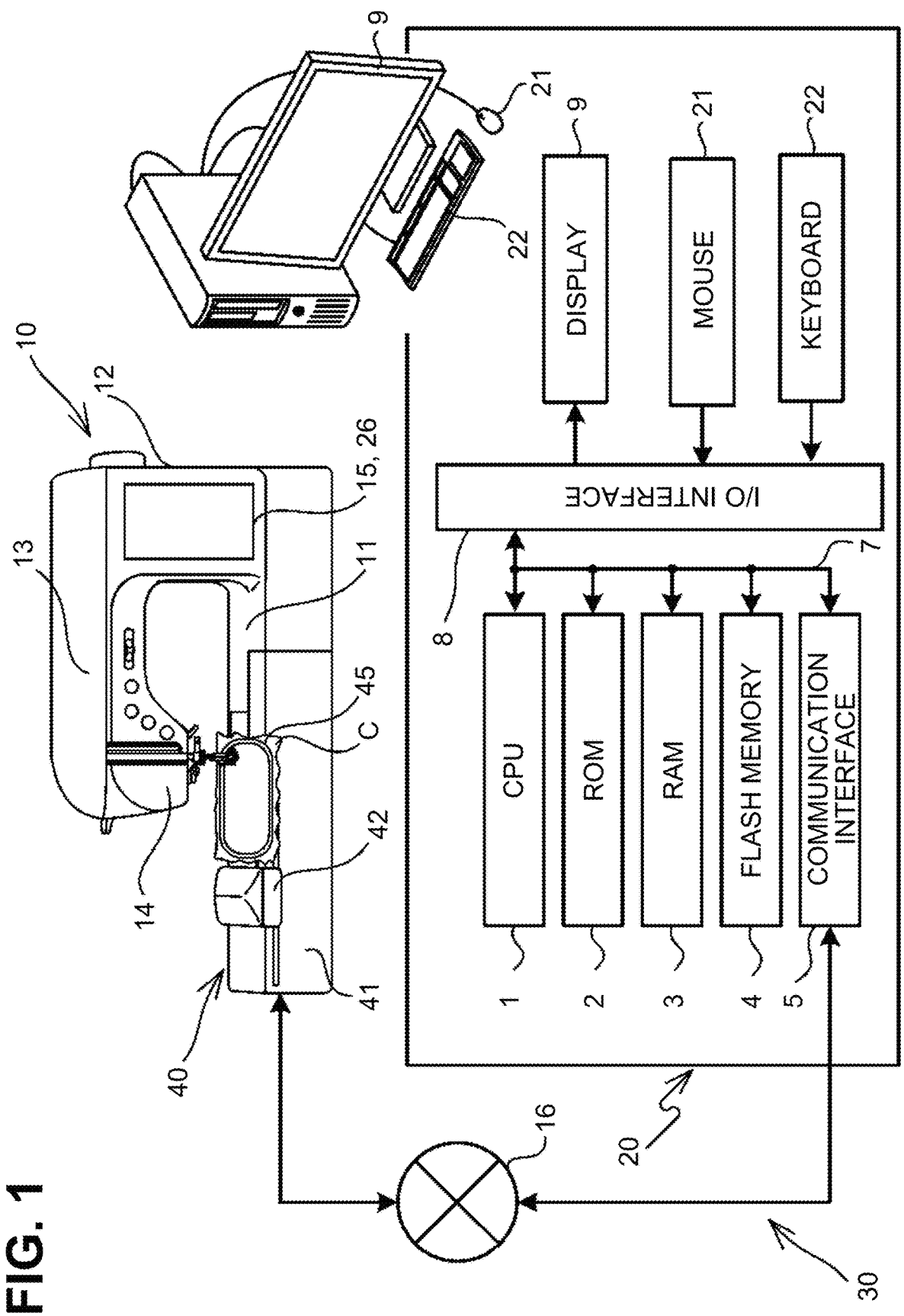
FIG. 1 illustrates a sewing system including a sewing machine and a sewing data generation apparatus according to aspects of the disclosure.

An embodiment is described with reference to the accompanying drawings. Referring to FIG. 1, a sewing system 30 is described. As illustrated in FIG. 1, the sewing system 30 includes a sewing machine 10 and a sewing data generation apparatus 20 (hereinafter abbreviated as an apparatus 20). The sewing machine 10 is capable of embroidering. The apparatus 20 is a known personal computer (PC) including a display 9, a mouse 21, and a keyboard 22.

Physical Structure of Sewing Machine and Embroidery Hoop

As illustrated in FIG. 1, the sewing machine 10 includes a bed 11, an upright arm 12, a horizontal arm 13, a head 14, and a movement mechanism 40. The bed 11 is a base of the sewing machine 10 and extends in the left-right direction. The upright arm 12 extends upward from a right end of the bed 11. A front surface of the upright arm 12 contains a liquid crystal display 15 and a touch screen 26. The horizontal arm 13 faces the bed 11 and extends to the left from an upper end of the upright arm 12. The head 14 is connected to a left end of the horizontal arm 13. The head 14 includes a needle bar, a presser bar, and a needle bar drive mechanism. A needle is removably attached to a lower end of the needle bar.

The movement mechanism 40 is configured to move a workpiece C held by the embroidery hoop 45 relative to the needle bar. The movement mechanism 40 includes a body case 41 and a carriage 42. For embroidering, a user attaches the embroidery hoop 45 to the carriage 42. A Y-axis movement mechanism included in the carriage 42 and an X-axis movement mechanism included in the body case 41 move the embroidery hoop 45 to needle drop points indicated on an XY coordinate system (an embroidery coordinate system) specific to the sewing machine 10. Along with the movement of the embroidery hoop 45, the needle attached to the needle bar and the shuttle mechanism are driven such that an embroidery pattern is sewn on the workpiece C.

Electrical Configuration of Apparatus 20

As illustrated in FIG. 1, the apparatus 20 includes a CPU 1, a ROM 2, a RAM 3, a flash memory 4, a communication interface 5, and an input/output ("I/O") interface 8. The CPU 1 controls the apparatus 20. The CPU 1 is connected to the ROM 2, the RAM 3, the flash memory 4, the communication interface 5, and the I/O interface 8, via a bus 7. The ROM 2 stores a boot program and a basic input output system (BIOS). The RAM 3 stores temporary data. The flash memory 4 stores various set values. The communication interface 5 is an interface through which to connect the apparatus 20 to a network 16. The CPU 1 is capable of sending and receiving data to and from an apparatus connected to the network 16, such as the sewing machine 10, through the communication interface 5. The I/O interface 8 is connected to the display 9, the mouse 21, and the keyboard 22. The display 9 is a liquid crystal display. The mouse 21 and the keyboard 22 are used to input instructions.

Main Process Executed at Apparatus 20

General outlines of processes executed at the apparatus 20 will be described. In a main process, the apparatus 20 generates embroidery data of a pattern to be embroidered on the sewing machine 10 based on data of an image, which may be a design drawn or selected by a user or a photograph. The main process is executed in a case where the user inputs an instruction for generating embroidery data after inputting an instruction for selecting image data and thread colors to be used for sewing. A procedure of the main process in which the apparatus 20 generates embroidery data will be described using image data representing a photograph of a swimming girl illustrated in FIG. 3A as an example. On determining that the start of the main process has been instructed, the CPU 1 of the apparatus 20 reads out an embroidery data generation program for executing the main process stored in the program storage area of the ROM 2, into the RAM 3. The CPU 1 executes the following steps based on the instructions included in the embroidery data generation program read out into the RAM 3. The flash memory 4 stores various parameters required for executing the main process. The RAM 3 stores various data obtained during the main process at appropriate times.

Figure 3A:
FIG. 3A illustrates an example of image data.

As illustrated in FIG. 2, the CPU 1 obtains, from the flash memory 4, image data representing the image of FIG. 3A selected by the user (S1). The image obtained at S1 is referred to as a source image. The CPU 1 sets coordinates of an image coordinate system to the source image obtained at S1. As illustrated in FIG. 3A, the CPU 1 positions the origin of the image coordinate system at an upper left corner of the source image with a right direction and a down directions of FIG. 3A as an X direction and a Y direction. The CPU 1 calculates an angular characteristic and an angular characteristic intensity for each of pixels in the source image based on the obtained image data (S2). The angular characteristic indicates a direction with a high continuity of a color in an image. The angular characteristic intensity indicates an intensity in change of the color. The CPU 1 calculates an angular characteristic and an angular characteristic intensity in a manner disclosed in, for example, Japanese Laid-Open Patent Publication No. 2001-259268. The CPU 1 may calculate an angular characteristic and an angular characteristic intensity in a different manner.

Figure 5A:
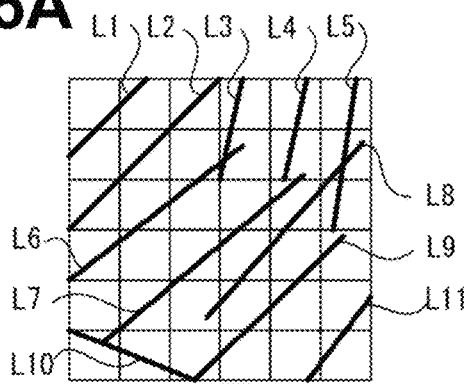
FIG. 5A illustrates positions of pixels and line segments in an image.

The CPU 1 generates, based on the angular characteristic and the angular characteristic intensity calculated at S2, line segment data which represents a position of a line segment in pixels each represented by pixel data, and stores the line segment data in the RAM 3 (S3). In this example, line segment data includes an angle component and a length component. The CPU 1 generates line segment data in a manner disclosed in, for example, Japanese Laid-Open Patent Publication No. 2001-259268. The CPU 1 may generate line segment data in a different manner. At S3 of this example, the calculated angular characteristic is set to an angle component of the line segment data, while a preset fixed value is set to a length component of the line segment data. The user may input a value to be set to the length component of the line segment data. As illustrated in FIG. 5A, for example, pixels are represented by 6×6 squares, and line segments L1-L11 are virtually positioned in the pixels. In this example, one pixel includes one line segment. In the example illustrated in FIG. 5A, the line segments L1-L11 are assigned IDs in the order of left to right and top to bottom by the CPU 1.

The CPU 1 obtains thread colors input at the sewing start as available colors (S4). The available colors may be previously registered or obtained from the sewing machine 10 via the network 16. The CPU 1 may obtain available colors based on information input by the user.

Figure 4A:
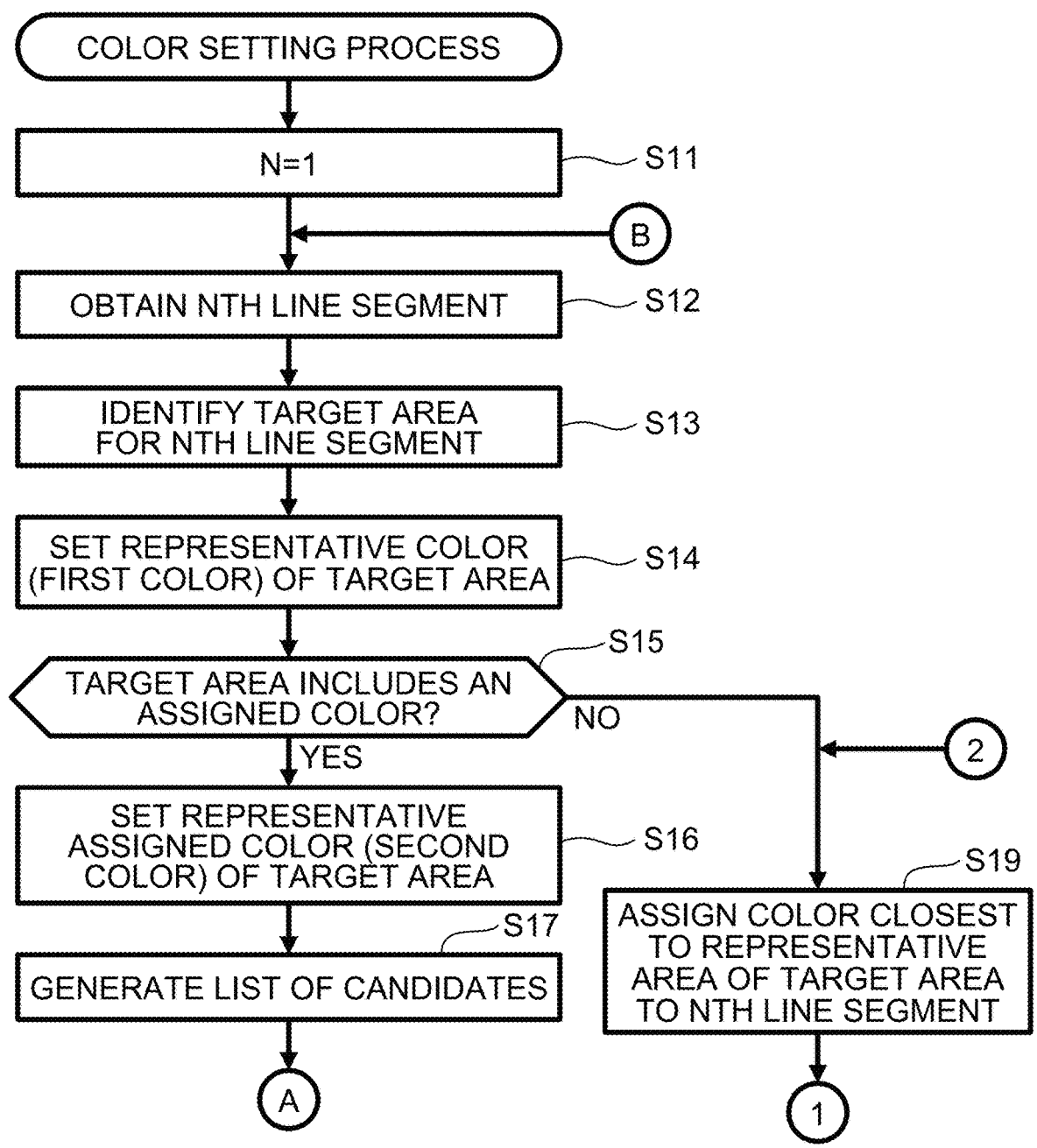
FIGS. 4A and 4B are flowcharts of a color setting process to be executed in the main process of FIG. 2.
Figure 4B:
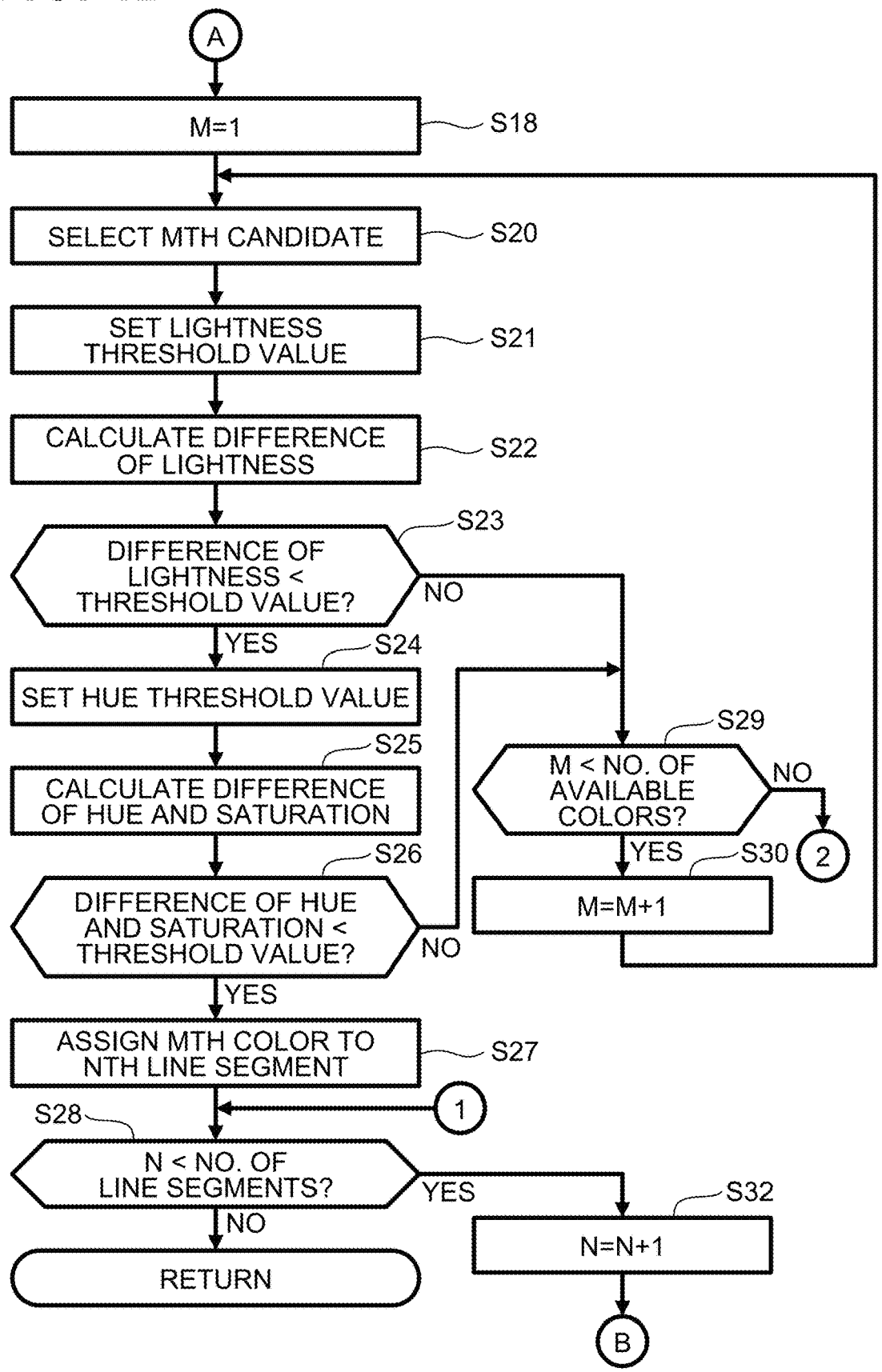
Figure 5B:
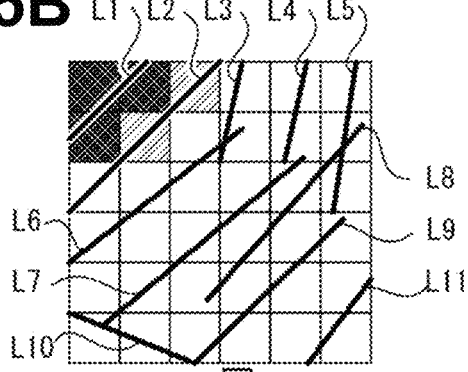
FIGS. 5B, 5C, and 5D illustrate a process of setting thread colors for sewing line segments.

The CPU 1 executes a color setting process (S5). In the color setting process, thread colors are set from the available colors obtained at S4, each associated with a line segment represented by the line segment data generated at S3. A thread color associated with a line segment is set as a thread color used for sewing stitch(es) representing the line segment. As illustrated in FIGS. 4A and 4B, the CPU 1 sets one to a variable N in the color setting process (S11). The variable N is used to obtain a line segment represented by the line segment data generated at S3 in the order of ID. The CPU 1 obtains an Nth line segment (S12). For example, the CPU 1 obtains a line segment L1 illustrated in FIG. 5A. The CPU 1 identifies a target area associated with the Nth line segment obtained at S12 (S13). The target area may be set as appropriate according to the image obtained at S1 and a type of stitches representing the target area. The target area of this example is a group of target pixels contiguous with each other in the pixels. In this example, the target pixels are grouped into a first pixel group in which the line segment obtained at S12 is positioned and a second pixel group contiguous with the first pixel group in an X direction. In an example illustrated in FIG. 5B, the first pixel group for the line segment L1 has three pixels crosshatched in black. The second pixel group has two pixels hatched.

The CPU 1 sets a representative color (a first color) representing the target area in the image (S14). The CPU 1 of this example sets a representative color CRN of the target area as a first color based on target pixel data pieces corresponding to the target pixels. The target pixel data pieces are included in pixel data pieces representing the pixels of the image data. The representative color CRN of the target area may be any color representative of the target area. The representative color CRN of the target area is represented by, for example, the mean value of color information of each pixel included in the target area. The representative color CRN of the target area may be represented by the mode of values in color information of each pixel included in the target area. In this example, the representative color CRN of the target area is an average color of the target pixels and is represented by the mean value of color information represented by RGB (red, green, blue) color values. In the example illustrated in FIG. 5B, the CPU 1 sets a representative color CR1 of the target area for the line L1 based on target pixel data pieces corresponding to the target pixels grouped into the first pixel group and the second pixel group.

The CPU 1 determines whether the target area identified at S13 includes an assigned color (S15). The assigned color is assigned from the available colors as a color representing the target area. The CPU 1 of this example defines a target area for each line segment and assigns a color of the available colors to a line segment based on color(s) already assigned to the target area and other line segments included in the target area. In the example illustrated in FIG. 5B, the line segments L1, L2 are positioned in the target area for the line segment L1. The line segments L1, L2 are yet to be assigned colors, thus the target area does not include an assigned color (S15: NO). In this case, the CPU 1 assigns, to an Nth line segment, a color closest or most analogous to the representative color CRN of the target area set at S14, from the available colors obtained at S4 (S19). For example, the CPU 1 assigns, to the line segment L1, a color closest to a representative color CR1 of the target area for the line segment L1 from the available colors, as a color W1 of a thread for sewing stitch(es) representing the line segment L1. The CPU 1 determines whether the variable N is smaller than the number of line segments represented by line segment data generated at S3 (S28). When the variable N is smaller than the number of line segments (S28: YES), the CPU 1 increments the variable N by one (S32) and returns to S12.

Figure 5C:
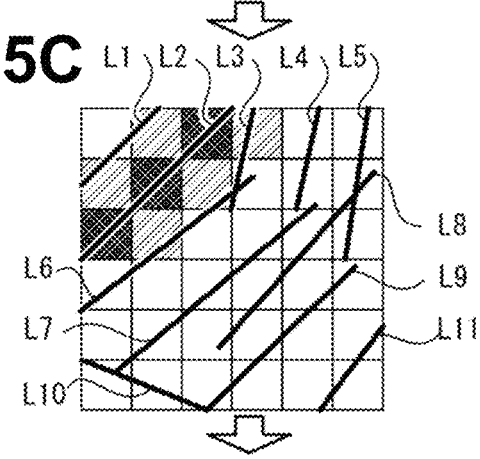

In a case where the CPU 1 obtains the second line segment L2 (S12), the CPU 1 identifies a target area for the second line segment L2 (S13). As illustrated in FIG. 5C, the target area is represented by three pixels crosshatched in black as a first pixel group, and five pixels hatched as a second pixel group. The CPU 1 sets a representative color CR2 of the target area for the line segment L2 (S14), and determines whether the target area identified at S13 includes an assigned color (S15). The target area for the line segment L2 includes the line segments L1, L2, L3, and L6. The line segment L1 is assigned the color W1. Thus, the target area includes at least one assigned color (S15: YES). In this case, the CPU 1 sets a representative assigned color CW2 of the target area for the line segment L2 as a color representing an assigned color (a second color) of the target area for the line segment L2 (S16). A representative assigned color CWN may be any color representative of assigned color(s). The representative assigned color CWN may be set in the same manner as or different manner from the representative color CRN of the target area. Specifically, the CPU 1 of this example calculates a ratio of the number of pixels overlapping line segment(s) in target pixels to the number of pixels overlapping line segment(s) already assigned color(s) in the target pixels, regarding each line segment assigned a color. The CPU 1 sets the representative assigned color CWN based on the calculated ratio regarding each line segment and a color assigned to each line segment. As illustrated in FIG. 5C, the line segment L1 only is assigned the color and is positioned in two of the target pixels. The CPU 1 thus sets the color W1 assigned to the line segment L1 as the representative assigned color CW2 of the target area for the line segment L2.

The CPU 1 generates a list of candidates of thread colors to be assigned to the line segment L2 from the available colors obtained at S4 (S17). In a case where at least one of the available colors is assigned as a color representing the target area, the CPU 1 of this example combines each of the available colors obtained at S4 with the representative color CRN of the target area set at S14, and selects some of the available colors close to the representative color CRN of the target area as candidate colors. More specifically, the CPU 1 combines each of the available colors with the representative assigned color (the second color) CWN, set at S16, of the assigned color(s) of the line segment(s) positioned in the target area, and selects colors as candidates from the available colors in the order closer to the representative color CRN of the target area. A method for comparing color information may be set as appropriate. For example, as to the representative color of the target area and results of color combination with the representative assigned color CW2, the CPU 1 may select candidate colors in increasing order of distance between colors in a color space that employs a color model such as RGB (red, green, blue), HSI (hue, saturation, intensity), HSV (hue, saturation, value), or Lab. As illustrated in FIG. 5C, the CPU 1 generates a candidate list LC2 of the available colors, which are arranged in the order close to the representative color CR2 of the target area, from the results of color combination with the representative assigned color CW2. In the candidate list LC2 showing the results of color combination with the representative assigned color CW2, higher listed candidates are closer to the representative color CR2 of the target area and smaller in ID number than lower listed candidates.

The CPU 1 sets one to a variable M (S18). The variable M is used for selecting a candidate from the candidate list in the order of ID. The CPU 1 selects a Mth candidate (S20). When the variable M is one, the CPU 1 selects a candidate 1 from the candidate list LC1. The CPU 1 determines whether the difference between color information representing an assigned color of the target area and color information representing a candidate is smaller than a threshold value (S21 to S26). The CPU 1 compares the color information representing the assigned color of the target area and the color information representing the candidate from the viewpoints of lightness, saturation, and hue, which are properties of color information. Regarding each of the properties (lightness, saturation, and hue) of the color information, the CPU 1 evaluates, using a threshold value corresponding to the color information of the assigned color of the target area, a comparison result between the color information representing the assigned color of the target area and the color information representing the candidate.

The CPU 1 sets a lightness threshold value regarding lightness (S21). In this example, lightness in color information is represented by an L* value of the L*a*b* color space. An L* value is a numerical value in a range of 0 to 100. When the lightness of the representative assigned color CWN of the target area for the Nth line segment is smaller than or equal to a first predetermined value, the CPU 1 sets a greater threshold value than when the lightness is greater than the first predetermined value. The first predetermined value may be a prestored value or a value predetermined by a user. The first predetermined value may be a value corresponding to the type of an image (e.g., design, landscape, or portrait) and an embroidery quality selected by the user (e.g., lightness priority). The first predetermined value and the lightness threshold values are stored in the flash memory 4. The CPU 1 reads data from the flash memory 4 and sets a lightness threshold value corresponding to the lightness of the representative assigned color CWN.

The CPU 1 calculates a difference of lightness between the Mth candidate selected at S20 and an assigned color of a line segment positioned in the target area (S22). For two or more assigned colors, the CPU 1 calculates differences of lightness between the Mth candidate and each of the assigned colors. The CPU 1 determines whether all differences of lightness calculated at S22 are smaller than the lightness threshold value set at S21 (S23). In a case where any of the differences of lightness calculated at S22 is greater than the lightness threshold value set at S21 (S23: NO), the CPU 1 executes S29 described later.

In a case where all differences of lightness calculated at S22 are smaller than the threshold value set at S21 (S23: YES), the CPU 1 sets a hue threshold value and a saturation threshold value (S24). When a value representing a hue of the representative assigned color CWN of the target area for the Nth line segment is in a first zone, the CPU 1 sets a greater hue threshold value than when the value is in a second zone that is different from the first zone. The first zone and the second zone may be previously set. The first zone and the second zone may be values corresponding to the type of an image (e.g., design, landscape, or portrait) and an embroidery quality selected by the user (e.g., skin tone priority). For example, the first zone includes a hue of green and the second zone includes a hue of red. When a saturation of the representative assigned color CWN is smaller than or equal to a second predetermined value, the CPU 1 sets a smaller saturation value than when the saturation is greater than the second predetermined value. In this example, hue and saturation are represented by an a* value and a b* value of the L*a*b* color space, respectively. Each of the a* value and the b* value is great in absolute value. A color farther from the center of the color space has a smaller absolute value and higher saturation than a color closer to the center of the color space. A direction determined by the a* value and the b* value corresponds to a hue. The absolute values of the a* value and the b* value depend on the lightness and hue. The first zone, the second zone, the hue threshold value, the second predetermined value, and the saturation thread value are stored in the flash memory 4. The CPU 1 reads data from the flash memory 4. When a direction determined by the a* value and the b* value is in the first zone, the CPU 1 sets a greater hue threshold value than when the direction is in the second zone different from the first zone. When each of the a* value and the b* value is smaller than or equal to the second predetermined value, the CPU 1 sets a smaller hue threshold value than when each value is greater than the second predetermined value.

The CPU 1 calculates a difference of hue and saturation between the Mth candidate selected at S20 and an assigned color of a line segment positioned in the target area (S25). For two or more assigned colors, the CPU 1 calculates differences of hue and saturation between the Mth candidate and each of the assigned colors. The CPU 1 determines whether all differences of hue and saturation calculated at S25 are smaller than the hue threshold value and the saturation threshold value set at S24 (S26). In a case where all differences of hue and saturation calculated at S25 are not smaller than the hue threshold value and the saturation threshold value set at S24 (S26: NO), the CPU 1 determines whether the variable M is smaller than the number of available colors (S29). When the variable M is smaller than the number of available colors (S29: YES), the CPU 1 increments the variable M by one (S30) and returns to S20. In a case where none of the candidate colors in the candidate list LC2 for the line segment L2 satisfies a condition at S23 or S26 (S29: NO), as illustrated in FIG. 5C, the CPU 1 assigns, to the line segment L2, a color W2 closest to the representative color CR2 of the target area set at S14 among the available colors obtained at S4 (S19). The CPU 1 then executes S28 described above.

Figure 5D:
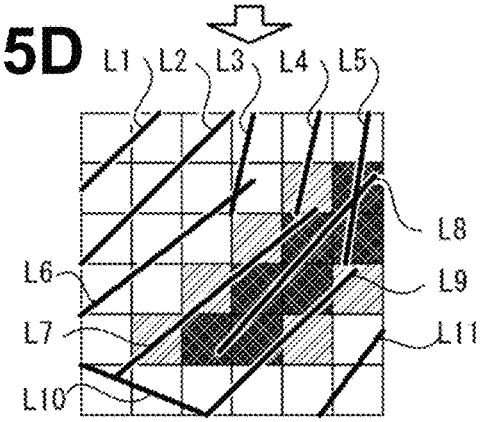

In a case where the CPU 1 obtains the eighth line segment L8 at S12, which is repeatedly executed, the CPU 1 identifies a target area (S13). In an example illustrated in FIG. 5D, the target area is represented by seven pixels crosshatched in black as a first pixel group, and six pixels hatched as a second pixel group. The CPU 1 sets a representative color CR8 of the target area for the line segment L8 (S14), and determines whether the target area identified at S13 includes an assigned color (S15). The target area for the line segment L8 includes the line segments L4, L5, L7, and L9. The line segments L4, L5, and L7 are assigned colors (S15: YES). In this case, the CPU 1 sets a representative assigned color CW8 of the target area for the line segment L8 (S16). Of the target pixels, two pixels overlap the line segment L4, two pixels overlap the line segment L5, and seven pixels overlap the line segment L7. Thus, the total number of pixels overlapping the line segments L4, L5, and L7 is 11. The CPU 1 calculates a ratio of the number of pixels overlapping each of line segments L4, L5, and L7 relative to the total number of pixels. The CPU 1 determines an average color by calculation based on the calculated ratio of the number of pixels and a color of each line segment, and sets the average color as a representative assigned color CW8 of the target area for the line segment L8.

The CPU 1 generates a candidate list LC8 for the line segment L8 from the available colors obtained at S4 (S17). In a series of steps S20 to S26, which is repeatedly executed, candidates are selected in the order of ID from the candidate list LC8 for the line segment L8. In a case where a candidate satisfies conditions at S23 and S26 (S26: YES), the CPU 1 assigns the Mth candidate color to the Nth line segment (S27). In the example illustrated in FIG. 5D, the CPU 1 assigns, to the line segment L8, a color W8 assigned ID number 1 in the candidate list LC8. When the variable N is greater than or equal to the number of line segments (S28: NO), the CPU 1 ends the color setting process and returns to the main process illustrated in FIG. 2. Through S5, all line segments positioned at S3 are each assigned one of the available colors obtained at S4. The CPU 1 connects line segments assigned the same color in turn (S6). Specifically, the line segments each have two end points, a start point and an end point, for sewing stitches. The CPU 1 repeatedly connects an end point of a first line segment and a start point of a next line segment that is positioned closest to the end point of the first line segment and assigned the same color as the first line segment with a connection segment, thereby connecting the line segments assigned the same color. The CPU 1 thus generates line segment data for every assigned color.

Figure 3B:
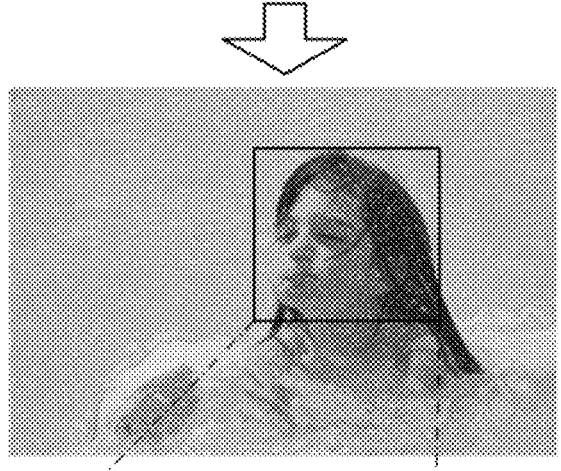
FIG. 3B illustrates an embroidery finish of embroidery data generated based on the image data of FIG. 3A.
Figure 3C:
FIG. 3C is a partially enlarged view of the embroidery finish of the embroidery data of FIG. 3B.
Figure 3D:
FIG. 3D is a partially enlarged view of an embroidery finish of embroidery data generated in a known method, as compared with FIG. 3C.

The CPU 1 generates embroidery data based on the line segment data generated for every assigned color (S7). The CPU 1 converts the coordinates of each end point of the line segments into those in the XY coordinate system specific to the sewing machine 10, thus calculating the coordinates of each needle drop point. The CPU 1 sets the sewing order of the needle drop points in the order in which the line segments are connected. As described above, the CPU 1 generates line segment data at S3, connects the line segment data at S6, and generates thread color data in which line segments represented by the line segment data are assigned thread colors at S5, thereby generating embroidery data including sewing order, the thread color data and needle drop point data representing coordinates of each needle drop point. The CPU 1 may generate embroidery data in a different method. The CPU 1 outputs the embroidery data generated at S7 (S8). For example, the CPU 1 outputs the embroidery data to the sewing machine 10 via the network 16. The CPU 1 thus ends the main process. In the above example, the CPU 1 can generate embroidery data illustrated in FIG. 3B from the source image illustrated in FIG. 3A through the main process. In an example illustrated in FIG. 3D, embroidery data of a girl is generated in a known method representing skin tone of her face by colors including light blue and purple which are disparate from the skin tone. In an example illustrated in FIG. 3C which is an enlarged view of FIG. 3B, unnatural colors to represent skin tone of her face such as light blue and purple are not assigned.

In the above embodiment, the flash memory 4 is an example of a non-transitory computer-readable medium of the disclosure. Step S1 is an example of a step of obtaining image data of the disclosure. Step S4 is an example of a step of obtaining a plurality of thread colors of the disclosure. Step S14 is an example of a step of setting a first color of the disclosure. Step S20 is an example of a step of selecting of the disclosure. Steps S23 and S26 are an example of a step of determining of the disclosure. Steps S19 and S27 are an example of a step of adding of the disclosure. Step S7 is an example of a step of generating embroidery data of the disclosure. Step S16 is an example of a step of setting a second color of the disclosure. Step S13 is an example of a step of obtaining a plurality of target pixels of the disclosure. Step S3 is an example of a step of generating line segment data of the disclosure. Steps S19 and S27 are an example of a step of assigning of the disclosure. Step S6 is an example of a step of connecting line segment data of the disclosure.

The apparatus 20 in the above embodiment generates embroidery data associating needle drop point data specifying a stitch position with thread color data representing a color selected from at least one assigned color as to each of stitches representing a target area (S7). When executing the main process in accordance with computer-readable instructions stored in the flash memory 4 to represent an image such as a photograph or a design as an embroidery pattern, the apparatus 20 generates embroidery data associating needle drop point data specifying a stitch position with thread color data representing a color selected from at least one assigned color as to each of stitches representing a target area. In a case where a difference between color information representing the at least one assigned color of the target area and color information representing a candidate is smaller than a threshold value, the apparatus 20 sets a color to be newly assigned to the target area. The apparatus 20 thus can reduce the possibility that a stitch partially representing a target area is assigned an unnatural color that is disparate from other colors already assigned in the target area to represent the embroidery pattern by combination of thread colors, as compared with known devices.

In a case where no color is assigned from the available colors as a color representing the target area (S15: NO), the apparatus 20 adds a color closest to the first color among the available colors to the target area as a color representing the target area (S19). The apparatus 20 enhances the possibility that the target area includes a color closest to the first color among the available colors, thereby reducing a difference between a color of the target area and a color represented by a stitch. In a case where an embroidery pattern is represented from an image by combination of thread colors, the apparatus 20 thus can enhance the possibility of assigning stitches with the available colors as close to actual colors included in the image as possible, as compared with known devices.

In a case where no candidate is determined in which a difference is smaller than a threshold value (S15: NO), the apparatus 20 adds a color closest to the first color among the available colors to the target area as a color representing the target area (S19). The apparatus 20 enhances the possibility that the target area includes a color closest to the first color among the available colors, thereby reducing a difference between an actual color included in an image and a color represented by a stitch. In a case where an embroidery pattern is represented from an image by combination of thread colors, the apparatus 20 can enhance the possibility of assigning stitches with the available colors as close to actual colors included in the image as possible, as compared with known devices.

In a case where the target area includes a plurality of colors assigned from the available colors, the apparatus 20 adds, to the target area, a candidate color, which is represented by color information having a smaller difference from each of the assigned colors than a threshold value (S26: YES, S27). The apparatus 20 thus is capable of adding a new assigned color as a color to be assigned to a line segment in the target area based on color differences from colors already assigned to the target area. The apparatus 20 reduces the use of a combination of colors between which a difference in color information is larger than a threshold value in the target area.

The apparatus 20 sets a second color representing an assigned color assigned to the target area (S16). The apparatus 20 sequentially selects a color which is close to the first color when combined with the second color from the available colors as a candidate (S20). The apparatus 20 can enhance the possibility of adding an available color having a high likelihood of being close to the first color when combined with the second color, as an assigned color. When compared with a case of randomly selecting each of the available colors as a candidate color, the apparatus 20 can efficiently add an available color having a high likelihood of being close to the first color when combined with the second color as an assigned color.

The apparatus 20 obtains image data representing an image that includes pixels (S1). The apparatus 20 obtains target pixels contiguous with each other as a target area (S13). The apparatus 20 sets a representative color CRN of the target area as a first color based on a plurality of target pixel data pieces corresponding to a plurality of target pixels, the plurality of target pixel data pieces being included in a plurality of pixel data pieces representing a plurality of pixels the image data (S14). In a case where an embroidery pattern is represented by combination of thread colors from an image, such as a photograph, of pixels each having different color information, the apparatus 20 can enhance the possibility of assigning stitches with colors as close to actual colors included in the image as possible, as compared with known devices.

The apparatus 20 generates, based on at least one pixel data piece of the plurality of pixel data pieces, line segment data which represents a position of a line segment representing pixels represented by pixel data (S3). In a case where a difference between a candidate color and the representative color is smaller than a threshold value at S23 and S26 (S23: YES, S26: YES), the apparatus 20 assigns thread color data of the candidate color to the line segment data (S27). In a case where there are a plurality of line segment data pieces each having the same thread color data assigned at S19 and S27, the apparatus 20 connects line segments represented by the plurality of line segment data pieces (S6). The apparatus 20 obtains at least one pixel corresponding to a line segment represented by line segment data and adjacent pixels around the at least one pixel as a plurality of target pixels (S13). The apparatus 20 generates embroidery data including a sewing order, thread color data, and needle drop point data (S7). The thread color data is assigned to line segment data representing line segments at a step of assigning. The line segment data is generated at a step of generating line segment data and the line segments are connected at S6, a step of connecting line segment data. The sewing order is determined based on the line segment data and the thread color data. The apparatus 20 thus can generate embroidery data to represent an image such as a photograph with stitches naturally.

Threshold values include lightness threshold values. The apparatus 20 determines whether a difference in lightness of color information between an at least one assigned color and a candidate color is smaller than a lightness threshold value (S23). The apparatus 20 thus reduces assigning of colors disparate in lightness to stitches corresponding to the target area.

When the lightness of the at least one assigned color is smaller than or equal to a first predetermined value, the apparatus 20 sets a greater threshold value than when the lightness is greater than the first predetermined value (S21). Two colors with a relatively small lightness difference are less distinguishable than those with a relatively large lightness difference. The apparatus 20 changes threshold values to suit lightness, thereby reducing assigning of colors disparate in lightness to stitches corresponding to the target area and reproducing colors close to those of the source image.

Threshold values include hue threshold values. The apparatus 20 determines whether a difference in hue value of color information between an at least one assigned color and a candidate color is smaller than a hue threshold value (S26). The apparatus 20 thus reduces assigning of colors disparate in hue to stitches corresponding to the target area.

When a value representing a hue of an at least one assigned color is in a first zone, the apparatus 20 sets a greater hue threshold value than when the value is in a second zone that is different from the first zone (S24). Two colors with their hue values in the first zone (e.g., green hue) are less distinguishable those with their hue values in the second zone (e.g., red hue) different from the first zone. The apparatus 20 changes threshold values to suit hue, thereby reducing assigning of colors disparate in hue to stitches corresponding to the target area and reproducing colors close to those of the source image.

Threshold values include saturation threshold values. The apparatus 20 determines whether a difference in saturation of color information between an at least one assigned color and a candidate color is smaller than a saturation threshold value (S26). The apparatus 20 thus reduces assigning of colors disparate in saturation to stitches corresponding to the target area.

When the saturation of the at least one assigned color is smaller than or equal to a second predetermined value, the apparatus 20 sets a smaller saturation threshold value than when the saturation is greater than the second predetermined value (S24). Two colors with a relatively large saturation difference are less distinguishable than those with a relatively small saturation difference. The apparatus 20 changes threshold values to suit saturation, thereby reducing assigning of colors disparate in saturation to stitches corresponding to the target area and reproducing colors close to those of the source image.

While a non-transitory computer-readable medium and an embroidery data generation method according to aspects of the disclosure are described in detail with reference to the specific embodiments thereof, these are merely examples, and various changes, arrangements and modifications may be made therein without departing from the spirit and scope of the disclosure. For example, the following modifications (A) to (C) may be made to the above embodiment.

(A) A non-transitory computer-readable medium may be a removable medium which is readable and writable, such as a magnetic disc, a magneto-optical disc, an optical disc, or a semiconductor memory. A non-transitory computer-readable medium may be a memory not intended to be portable, such as a hard disk drive or solid state drive (SSD) fixedly built in a computer that executes processing. The configuration of the apparatus 20 that executes instructions stored in a non-transitory computer-readable medium may be modified as appropriate. The apparatus 20 may be a device for embroidery data generation use only, or a portable terminal device such as a smartphone or a tablet PC. The apparatus 20 may be included in the sewing machine 10. Examples of the sewing machine 10 include an industrial sewing machine and a multi-needle sewing machine, which are capable of embroidering.

(B) A program including instructions for the main process (refer to FIG. 2) executed at the apparatus 20 may be stored in a storage device of the apparatus 20 until the CPU 1 executes the program. Thus, a method for obtaining the program, a route through which the program is obtained, and a device that stores the program may be changed as appropriate. The program to be executed by the CPU 1 may be received from another device via a cable or wireless communication, and may be stored in a storage device such as a flash memory. Examples of the other device include a PC and a server connected via a network.

(C) The steps in the main process (FIG. 2) executed at the apparatus 20 are not limited to being executed by the CPU1, but some or all of the steps may be executed by another electronic device (e.g., an ASIC). In some embodiments, the steps of the main process may be executed by multiple electronic devices (e.g., CPUs). The steps of the main process may be executed in a different order. A step may be omitted from or added to the main process. The scope of the disclosure includes such configuration that an operating system (OS) operating on the apparatus 20 executes some or all of the steps of the main process based on a command/instruction from the CPU1. For example, the following modifications (C-1) to (C-4) may be added to the main process.

(C-1) Various types of source images are processable in the main process. Examples of the source images include a design drawn by a user. A method for setting a target area may be changed as appropriate in consideration with a source image. The target area may include a first pixel group in which a line segment obtained at S12 is positioned and a second pixel group contiguous with the first pixel group in at least one of an X direction and a Y direction. The target area may be shaped in a circle radially extending from the center of the line segment obtained at S12 or a rectangle having a predetermined distance from the center of the line segment obtained at S12. When a source image is a yellow round object, the target area may be inside of an outline of the round object and may be sewn with predetermined stitch type (e.g., tatami stitch or satin stitch). In this case, each of stitches may be directly assigned a color of the available colors in accordance with the above main process. Alternatively, a process different from the main process may be used in which, once assigned colors are added to the target area, each of stitches are assigned a color of the assigned colors by a predetermined rule.

(C-2) Color information used for comparison between at least one assigned color and a candidate color may be changed as appropriate. For example, color information may include at least one of lightness, saturation, and hue. Color information may be represented by a three-dimensional color space that employs a color model such as RGB, HSI, HSV, or Lab. Threshold values corresponding to color information may be stepwise values according to color information or a fixed value regardless of color information. In a case where a target area for the Nth line segment includes a plurality of colors already assigned, threshold values corresponding to color information may be set according to each of the assigned colors. A method for setting a first color representing a target area may be changed as appropriate. For the target area inside of an outline of a yellow round object, the CPU 1 may set the first color to yellow.

(C-3) In a case where no color is assigned from the available colors as a color representing the target area (S15: NO), the CPU 1 may assign a color having a difference from the representative color of the target area set at S14 that satisfies a predetermined condition, from the available colors, to the Nth line segment. In a case where no candidate is determined in which a difference in color information from an assigned color is smaller than or equal to a threshold value (S29: NO), the CPU 1 may assign at least one assigned color to the line segment. In a case where the CPU 1 determines that, at at least one of steps S23 and S26, the target area includes assigned colors, the CPU 1 may add, to the target area, a candidate that is represented by color information having a difference smaller than or equal to a threshold value relative to a representative color of the assigned colors or part of color information for the assigned colors. The CPU 1 may not necessarily add all of the available colors to a candidate list at S17. A method for setting a candidate selection order may be changed as appropriate. The CPU 1 may not generate a candidate list at S17. Instead, the CPU 1 may read out the available colors in order (e.g., a thread color number order, a registration order, a usage frequency order, a favorite order).

(C-4) A method of generating embroidery data may be changed as appropriate. For example, a type of stitches to represent a source image may be cross stitch. Embroidery data may be generated to represent a source image using needle punching applied to decorate a workpiece with yarns and a dedicated needle. In this case, embroidery data may associate thread color data with position data. The thread color data represents a color selected from at least one assigned color. The position data specifies a position to sew with a thread color indicated by thread color data representing a target area (or a position where a thread is embedded in a workpiece).

The disclosure may be applicable by various forms, for example, embroidery data generation programs, embroidery data generation apparatuses, and sewing machines capable of embroidering.

What is claimed is:

1. A non-transitory computer-readable medium storing computer-readable instructions, the computer-readable instructions, when executed by a computer, causing the computer to execute a process, the process comprising:
   obtaining image data representing an image;
   obtaining a plurality of thread colors as available colors to be used for sewing an embroidery pattern;
   setting a first color representing a target area in the image;
   in a case where at least one color is assigned from the available colors as a color representing the target area, selecting a color close to the first color when combined with the at least one color assigned, from the available colors, as a candidate;
   determining whether a difference between color information representing the at least one color assigned and color information representing the candidate is smaller than a threshold value;
   in a case where the determining determines that the difference is smaller than the threshold value, adding the candidate to the at least one color assigned;
   in a case where a plurality of colors are assigned from the available colors each as a color representing the target area and the candidate is represented by color information having a smaller difference from each of the plurality of colors assigned than the threshold value, adding the candidate to the target area;
   generating embroidery data associating thread color data with position data, the thread color data representing a color selected from the at least one color assigned, the position data specifying a position to sew with a thread having the color represented by the thread color; and
   outputting the generated embroidery data to a sewing machine.

2. The non-transitory computer-readable medium according to claim 1, wherein, in a case where no color is assigned from the available colors as a color representing the target area, the adding adds a color closest to the first color among the available colors to the target area as the color representing the target area.

3. The non-transitory computer-readable medium according to claim 1, wherein, in a case where the determining does not determine that the difference is smaller than the threshold value, the adding adds a color closest to the first color among the available colors to the target area as the color representing the target area.

4. The non-transitory computer-readable medium according to claim 1,
   wherein the process further comprises setting a second color representing the at least one color assigned, and
   wherein the selecting sequentially selects a color close to the first color when combined with the second color, from the available colors, as the candidate.

5. The non-transitory computer-readable medium according to claim 1,
   wherein the obtaining image data representing an image obtains the image data representing the image that includes a plurality of pixels, the plurality of pixels being represented by a plurality of pixel data pieces, wherein the process further comprises obtaining a plurality of target pixels contiguous with each other in the plurality of pixels, as the target area, and wherein the setting sets a representative color of the target area as the first color based on a plurality of target pixel data pieces corresponding to the plurality of target pixels, the plurality of target pixel data pieces being included in the plurality of pixel data pieces.

6. The non-transitory computer-readable medium according to claim 5, wherein the process further comprises:
generating, based on at least one pixel data piece of the plurality of pixel data pieces, line segment data representing a position of a line segment representing at least one pixel represented by the at least one pixel data piece;

in a case where the determining determines that the difference is smaller than the threshold value, assigning the thread color data of the candidate to the line segment data; and in a case where the generating generates a plurality of line segment data pieces representing a plurality of positions of a plurality of line segments and each of the plurality of line segment data pieces is assigned a corresponding one of a plurality of thread color data pieces representing the same color, connecting the plurality of line segments represented by the plurality of line segment data pieces, wherein the obtaining a plurality of target pixels obtains the at least one pixel corresponding to the line segment represented by the line segment data and a plurality of adjacent pixels around the at least one pixel as the plurality of target pixels, and wherein the embroidery data further includes a sewing order determined based on the plurality of line segment data pieces representing the plurality of line segments connected and a plurality of thread color data pieces assigned to the plurality of line segment data pieces.

7. The non-transitory computer-readable medium according to claim 1, wherein the threshold value includes a lightness threshold value regarding lightness, and wherein the determining determines whether a difference between lightness of the color information representing the at least one color assigned and lightness of the color information representing the candidate is smaller than the lightness threshold value.

8. The non-transitory computer-readable medium according to claim 7, wherein the lightness threshold value is greater when the lightness of the at least one color assigned is smaller than or equal to a first specified value than when the lightness of the at least one color assigned is greater than the first specified value.

9. The non-transitory computer-readable medium according to claim 1, wherein the threshold value includes a hue threshold value regarding hue, and wherein the determining determines whether a difference between a hue value of the color information representing the at least one color assigned and a hue value of the color information representing the candidate is smaller than the hue threshold value.

10. The non-transitory computer-readable medium according to claim 9, wherein the hue threshold value is greater when the hue value of the color information representing the at least one color assigned is in a first section than when the hue value is in a second section different from the first section.

11. The non-transitory computer-readable medium according to claim 1, wherein the threshold value includes a saturation threshold value regarding saturation, and wherein the determining determines whether a difference between saturation of the color information representing the at least one color assigned and saturation of the color information representing the candidate is smaller than the saturation threshold value.

12. The non-transitory computer-readable medium according to claim 11, wherein the saturation threshold value is smaller when the saturation of the color information representing the at least one color assigned is smaller than or equal to a second specified value than when the saturation of the color information representing the at least one color assigned is greater than the second specified value.

13. A method of generating embroidery data comprising:
obtaining image data representing an image;
obtaining a plurality of thread colors as available colors to be used for sewing an embroidery pattern;
setting a first color representing a target area in the image;
in a case where at least one color is assigned from the available colors as a color representing the target area, selecting a color close to the first color when combined with the at least one color assigned, from the available colors, as a candidate;
determining whether a difference between color information representing the at least one color assigned and color information representing the candidate is smaller than a threshold value;
in a case where the determining determines that the difference is smaller than the threshold value, adding the candidate to the at least one color assigned;
in a case where a plurality of colors are assigned from the available colors each as a color representing the target area and the candidate is represented by color information having a smaller difference from each of the plurality of colors assigned than the threshold value, adding the candidate to the target area;
generating the embroidery data associating thread color data with position data, the thread color data representing a color selected from the at least one color assigned, the position data specifying a position to sew with a thread having the color represented by the thread color; and
embroidering the embroidery pattern of the image onto a workpiece based on the generated embroidery data.

14. A sewing machine for executing a process, the process comprising:
obtaining image data representing an image;
obtaining a plurality of thread colors as available colors to be used for sewing an embroidery pattern;
setting a first color representing a target area in the image;
in a case where at least one color is assigned from the available colors as a color representing the target area, selecting a color close to the first color when combined with the at least one color assigned, from the available colors, as a candidate;

determining whether a difference between color information representing the at least one color assigned and color information representing the candidate is smaller than a threshold value;

in a case where the determining determines that the difference is smaller than the threshold value, adding the candidate to the at least one color assigned;

in a case where a plurality of colors are assigned from the available colors each as a color representing the target area and the candidate is represented by color information having a smaller difference from each of the plurality of colors assigned than the threshold value, adding the candidate to the target area;

generating the embroidery data associating thread color data with position data, the thread color data representing a color selected from the at least one color assigned, the position data specifying a position to sew with a thread having the color represented by the thread color; and embroidering the embroidery pattern of the image onto a workpiece based on the generated embroidery data.

\* \* \* \* \*